(12) United States Patent
Werr (10) Patent No.: US 9,450,999 B2
(45) Date of Patent: *Sep. 20, 2016

(54) HIGH PERFORMANCE DATA STREAMING

(71) Applicant: NYSE Group, Inc., New York, NY (US)

(72) Inventor: Emile Werr, Wayne, NJ (US)

(73) Assignee: NYSE Group, Inc., New York, NY (US)

(*) Notice: Subject to any disclaimer, the term of this patent is extended or adjusted under 35 U.S.C. 154(b) by 346 days.

This patent is subject to a terminal disclaimer.

(21) Appl. No.: 14/030,676

(22) Filed: Sep. 18, 2013

(65) Prior Publication Data

US 2014/0089459 A1    Mar. 27, 2014

Related U.S. Application Data (60) Provisional application No. 61/704,302, filed on Sep. 21, 2012, provisional application No. 61/778,872, filed on Mar. 13, 2013, provisional application No. 61/832,075, filed on Jun. 6, 2013.

(51) Int. Cl.
| | |
|---|---|
| G06F 15/16 | (2006.01) |
| H04L 29/06 | (2006.01) |
| H04L 29/08 | (2006.01) |
| G06F 9/38 | (2006.01) |

(52) U.S. Cl.
CPC ............ H04L 65/60 (2013.01); G06F 9/38 (2013.01); H04L 67/06 (2013.01); H04L 67/1095 (2013.01); H04L 67/1097 (2013.01); H04L 69/14 (2013.01)

(58) Field of Classification Search
CPC ... H04L 65/60; H04L 67/06; H04L 67/1095; H04L 67/1097; H04L 69/14; G06F 9/38
USPC .......................................................... 709/217
See application file for complete search history.

(56) References Cited

U.S. PATENT DOCUMENTS

| | | | |
|---|---|---|---|
| 5,574,900 A | 11/1996 | Huang et al. | |
| 5,813,005 A * | 9/1998 | Tsuchida ............... | G06F 9/5077 707/999.002 |
| 6,101,495 A | 8/2000 | Tsuchida et al. | |
| 6,208,990 B1 * | 3/2001 | Suresh .............. | G06F 17/30563 707/999.006 |

(Continued)

OTHER PUBLICATIONS

Supplementary European Search Report dated Aug. 4, 2015 in corresponding European Patent Application No. 13839088.5.

(Continued)

*Primary Examiner* — Kristie Shingles
*Assistant Examiner* — Timothy Sowa
(74) *Attorney, Agent, or Firm* — DLA Piper LLP (US)

(57) ABSTRACT

Methods, systems and computer program products for high performance data streaming are provided. A computer-implemented method may include receiving a data mapping describing an association between one or more fields of a data storage location of a data source and one or more fields of a data storage location of a target destination, generating a data transfer execution plan from the data mapping to transfer data from the data source to the target destination where the data transfer execution plan comprises a determined degree of parallelism to use when transferring the data, and transferring the data from the storage location of the data source to the data storage location of the target destination using the generated data transfer execution plan.

20 Claims, 4 Drawing Sheets

(56) References Cited

U.S. PATENT DOCUMENTS

| | | | |
|---|---|---|---|
| 6,356,977 B2 * | 3/2002 | Ofek | G06F 3/0607 709/217 |
| 6,961,925 B2 | 11/2005 | Callahan, II et al. | |
| 6,970,911 B2 * | 11/2005 | Inaba | G06F 15/17 709/201 |
| 7,552,192 B2 * | 6/2009 | Carmichael | H04L 12/2801 709/217 |
| 7,599,910 B1 | 10/2009 | Tsuchida et al. | |
| 7,836,033 B1 | 11/2010 | Moorthi et al. | |
| 8,606,744 B1 * | 12/2013 | Dageville | G06F 17/3038 707/602 |
| 8,898,388 B1 | 11/2014 | Kimmel | |
| 9,148,461 B2 * | 9/2015 | Werr | H04L 67/06 709/217 |
| 9,183,140 B2 | 11/2015 | Werner et al. | |
| 2003/0093439 A1 | 5/2003 | Mogi et al. | |
| 2004/0068575 A1 * | 4/2004 | Cruise | H04L 69/16 709/232 |
| 2005/0055351 A1 | 3/2005 | Barton et al. | |
| 2005/0131853 A1 | 6/2005 | Sampath et al. | |
| 2005/0144361 A1 | 6/2005 | Gonzalez et al. | |
| 2006/0045109 A1 * | 3/2006 | Blackmore | H04L 69/32 370/402 |
| 2007/0185938 A1 | 8/2007 | Prahlad et al. | |
| 2008/0256166 A1 * | 10/2008 | Branson | H04L 12/4633 709/201 |
| 2009/0094195 A1 * | 4/2009 | Black | G06F 17/30516 707/999.002 |
| 2010/0082543 A1 | 4/2010 | Nagarajan | |
| 2010/0223539 A1 * | 9/2010 | Nowoczynski | G06F 3/067 714/807 |
| 2011/0246763 A1 * | 10/2011 | Karnes | H04L 69/14 713/150 |
| 2011/0276962 A1 * | 11/2011 | Chambers | G06F 9/445 718/1 |
| 2013/0073895 A1 | 3/2013 | Cohen | |
| 2013/0138616 A1 * | 5/2013 | Gupta | G06F 17/30174 707/690 |
| 2013/0144973 A1 * | 6/2013 | Li | H04L 41/26 709/217 |
| 2013/0290618 A1 | 10/2013 | Werner et al. | |
| 2014/0164516 A1 * | 6/2014 | Maltbie | H04L 67/06 709/204 |
| 2014/0359271 A1 | 12/2014 | Gedik et al. | |

OTHER PUBLICATIONS

International Preliminary Report on Patentability issued on Apr. 2, 2015 and International Search Report and Written Opinion dated Apr. 10, 2014 in corresponding International Application No. PCT/US13/60409.

* cited by examiner

HIGH PERFORMANCE DATA STREAMING

CROSS-REFERENCE TO RELATED APPLICATIONS

This application claims priority to U.S. Provisional Patent Application No. 61/704,302, filed Sep. 21, 2012, U.S. Provisional Patent Application No. 61/778,872, filed Mar. 13, 2013, and U.S. Provisional Patent Application No. 61/832,075, filed Jun. 6, 2013, the disclosures of which are hereby incorporated by reference herein in their entirety.

TECHNICAL FIELD

The field generally relates to data processing and, more specifically, to the transfer of data across distributed environments.

BACKGROUND

Approximately 2.5 quintillion bytes of data are generated globally each day. In addition, it is estimated that 90% of the world's data has been produced within the last two years alone.

The term "big data" refers to collections of large, complex data sets. Managing a gigantic collection of data presents many challenges which include capturing, storing, searching, transforming, transferring, and analyzing such data. In particular, existing data processing tools are not capable of manipulating and transporting massive amounts of data quickly enough to satisfy business requirements.

Accordingly, there exists a need for a high performance solution to quickly process, transform and distribute large amounts of data in a manner that meets customer demands, business needs, and service level agreements.

SUMMARY

Embodiments generally relate to high performance data streaming. In one embodiment, a processor receives a data mapping describing an association between one or more fields of a data storage location of a data source and one or more fields of a data storage location of a target destination. The processor generates a data transfer execution plan from the data mapping to transfer data from the data source to the target destination where the data transfer execution plan comprises a determined degree of parallelism to use when transferring the data. The processor also transfers the data from the storage location of the data source to the data storage location of the target destination using the generated data transfer execution plan.

In another embodiment, a system includes a memory and a processor coupled to the memory to provide high performance data streaming. The system receives a data mapping describing an association between one or more fields of a data storage location of a data source and one or more fields of a data storage location of a target destination. The system generates a data transfer execution plan from the data mapping to transfer data from the data source to the target destination where the data transfer execution plan comprises a determined degree of parallelism to use when transferring the data. The system also transfers the data from the storage location of the data source to the data storage location of the target destination using the generated data transfer execution plan.

In a further embodiment, a computer-readable medium has instructions that, when executed by a processor, cause the processor to perform operations. The instructions include computer-readable program code configured to cause the processor to receive a data mapping describing an association between one or more fields of a data storage location of a data source and one or more fields of a data storage location of a target destination. The instructions also include computer-readable code configured to cause the processor to generate a data transfer execution plan from the data mapping to transfer data from the data source to the target destination where the data transfer execution plan comprises a determined degree of parallelism to use when transferring the data. The instructions further include computer-readable code configured to cause the processor to transfer the data from the storage location of the data source to the data storage location of the target destination using the generated data transfer execution plan.

Further embodiments, features, and advantages of the present invention, as well as the structure and operation of the various embodiments of the present invention, are described in detail herein.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

The present invention is directed to systems, methods, and computer program products for high performance data streaming. In an embodiment, a high performance data streamer is a high-speed data transfer system that performs rapid transfer of large data sets between distributed environments. For example, a high performance data streamer provides fast and reliable data transport across distributed data stores within and across organizations anywhere in the world.

Unlike traditional file transfer tools (e.g., FTP, SFTP, RCP, etc.), a high performance data streamer is unique in that it supports file movement of all types, integrates with Hadoop, interfaces with any database/data storage technology, includes a metadata repository for configuration of source-to-target mappings, provides security and granular user entitlement for data access and data operations, includes a graphical user interface (GUI) for end-users, and provides an application programming interface (API) for back-end systems integration.

Figure 1:
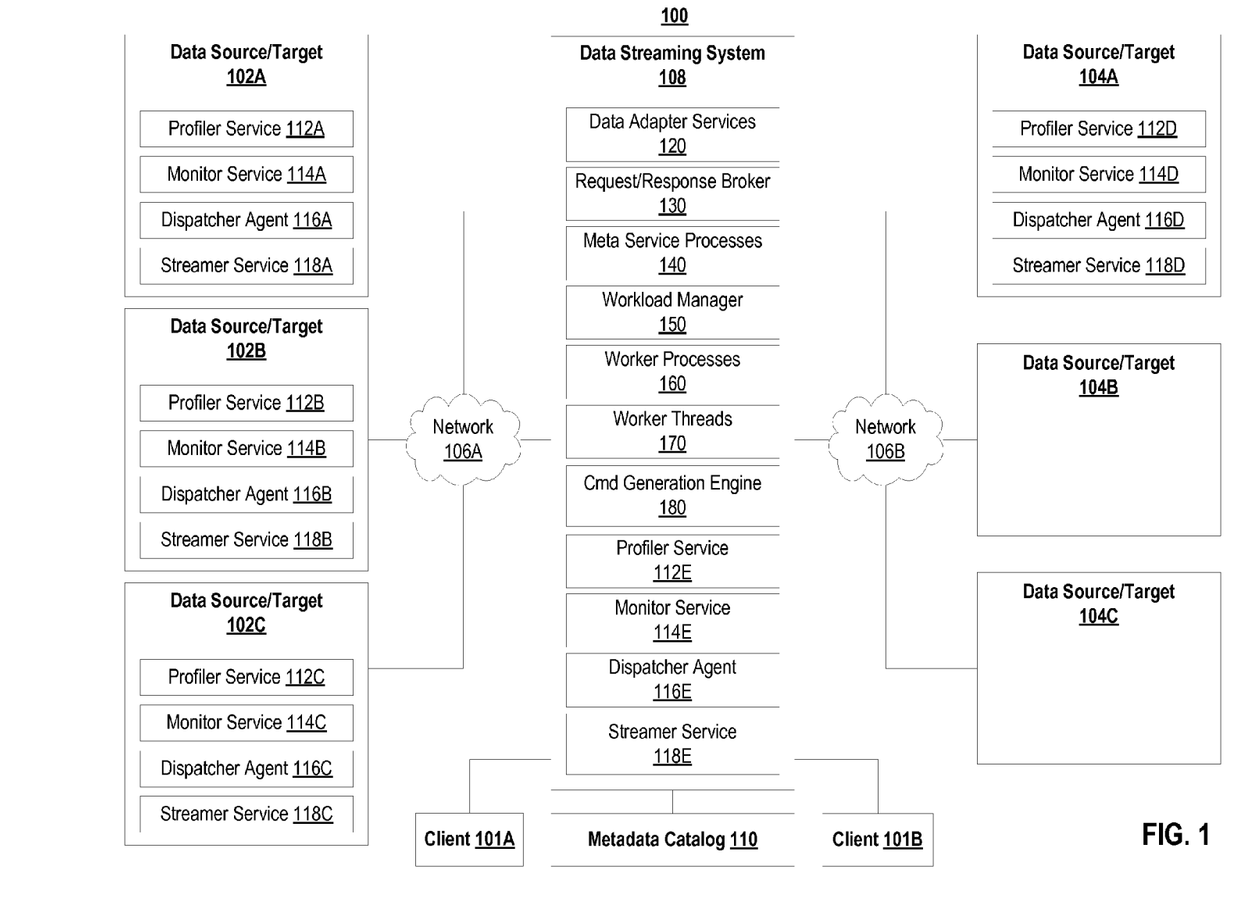
FIG. 1 illustrates a block diagram of a high performance data streaming system architecture, in accordance with various embodiments of the present invention.

FIG. 1 illustrates a block diagram of a high performance data streaming system architecture 100, in accordance with various embodiments of the present invention.

The high-performance data streaming system architecture 100 includes clients 101A and 101B, a first set of data sources/targets 102A-102C, a second set of data sources/targets 104A-104C, networks 106A and 106B, data streaming system 108 and metadata catalog 110.

The high-performance data streaming system architecture 100 includes one or more physical and/or virtual computer systems connected to a network, such as networks 106A and 106B. The network may be, for example, a public network (e.g., the Internet), a private network (e.g., a local area network (LAN) a wide area network (WAN)), a high definition file system (HDFS), a storage area network (SAN), network attached storage (NAS), inter-process communications (IPC) or any combination thereof.

The computer systems may include personal computers (PC), laptops, mobile phones, tablet computers, or any other computing device. The computer systems may run an operating system (OS) that manages hardware and software. The computer systems also may include one or more server machines. A server machine may be a rackmount server, a router computer, a personal computer, a portable digital assistant, a mobile phone, a laptop computer, a tablet computer, a camera, a video camera, a netbook, a desktop computer, a media center, or any combination thereof. In one example, clients 101A and 101B, data sources/targets 102A-102C, data sources/targets 104A-104C, and data streaming system 108 are each provided using one or more computer systems.

The high-performance data streaming system architecture 100 also may include a persistent data store, such as a file server or network storage, capable of storing various types of data. In some embodiments, the data store might include one or more other types of persistent storage such as an object-oriented database, a relational database, an in-memory database, and so forth. In one example, metadata catalog 110 may reside within a single data store or across multiple, different logical/physical data stores.

Clients 101A and 101B may be user-controlled or automated applications, utilities, tools, or other software connected to and communicating with data streaming system 108. Clients 101A and 101B also may be computer systems that generate and send application programming interface (API) or other service-based calls to data streaming system 108, for example, to transfer data from a data source (e.g., 102A, 102B, 102C) to a target destination (e.g., 104A, 104B, 104C), or vice versa when applicable.

In one example, the movement of data between two different computer systems is orchestrated by data streaming system 108. A source system holds data that is to be transferred to a target system. The data that is to be transferred is based on a mapping between the source system and target system. Data streaming system 108 allows the mapping, orchestration and streaming of data to and from various types of different data storage solutions including, but not limited to, network attached storage (NAS), database technologies, file systems, data storage appliances, etc.

For example, data may be streamed between any type of similar or dissimilar data storage resources (e.g., file system to file system, database to database, file system to database, database to file system, appliance to appliance, file system to appliance, appliance to file system, appliance to database, database to appliance, etc.). Further, data may be streamed from point to point, merged at a single point, split, filtered, aggregated, transformed, and/or streamed to one or more, different destinations independently and/or simultaneously.

A first set of data sources/targets 102A-102C generally represents computer systems that store data, for example, in a first location or on behalf of a particular organization. A second set of data sources/targets 104A-104C generally represents computer systems that store or will store data, for example, in a second location or on behalf of a different organization. In some examples, data may be streamed at the same physical location (e.g., data center), within the same organization, and on the same computer system. Further, a single computer system may comprise many different data sources of one or more different types.

Each data source/target system and each data streaming system 108 may include its own respective profiler service (e.g., profiler service 112A-112E), monitor service (114A-114E), dispatcher agent (116A-116E), and/or streamer service (116A-116E). In some embodiments, each data source and target has the aforementioned suite of services. In other embodiments, some data sources and some targets may have the services, but others will not. Some data sources and some targets may only have a partial set of the services. Yet, in further embodiments, no source or target employs such services.

Profiler service 112A-112E captures statistics about what is happening on a computer system (e.g., memory, CPU, disk utilization, etc.). A profiler service 112A-112E may write data to a metadata catalog 110 either directly or with the assistance of meta-service processes 140. In one example, a profiler service 112A-112E may collect profiling data locally in addition to writing such data to metadata catalog 110.

In an embodiment, data sources do not communicate directly with target destinations. Instead, data streaming system 108 orchestrates an entire streaming transaction on behalf of the source and target using metadata aware components and processes. In some embodiments, the metadata aware components and processes of data streaming system 108 do not communicate directly with some or any of the other components or processes of the system. For example, some or all of such communication may occur indirectly using metadata stored in metadata catalog 110.

Data streaming system 108 queries metadata catalog 110 to determine capabilities and availability of computer systems involved/associated with a data streaming transaction. This allows data streaming system 108 to intelligently decide when to initiate data streaming, for example based on available computing power or resources, and how to effectively allocate resources when performing the data streaming.

In one example, a profiler service 112A-112E stores computer system and/or data store processing information at regular/various intervals (e.g., time, events, etc.), which may be based on a configuration setting. For example, a profiler service 112A-112E may take a snapshot of current utilization statistics every five seconds. Utilization statistics may include any statistics associated with CPU utilization, memory utilization, disk utilization, network utilization, and/or data store utilization. Such statistics may be stored, analyzed, aggregated, and further processed over time to develop historical statistics, such as historical baselines.

In an embodiment, a dashboard is presented to users and/or administrators to provide a current performance snapshot and/or historical statistics. In one example, a current snapshot is provided as an online graph with color coding as part of a web dashboard. An operator/administrator may click on an indicator that turns red to view associated diagnostics and to receive further information about an issue. In another example, a web dashboard is used to present deviations (real-time or previous) from the historical usage patterns.

A monitor service 114A-114E is an agent that monitors other services that are configured to be running on a particular host. For example, monitor service 114A-114E may determine services that are supposed to be running on a particular computer system (e.g., data sources/targets such as 102A, 102B, 102C, 104A, and data streaming system 108, etc.). In one example, monitor service 114A-114E pings these services on a periodic basis and automatically bootstraps and restarts any services that are not running.

Dispatcher agent 116A-116E is responsible for receiving client requests. The requests may be to execute some sort of command on a particular host that is running a dispatcher agent 116A-116E. For example, a master node or worker processes 160 of data streaming system 108 may call a respective dispatcher agent 116A-116E to perform a command on the system where the dispatcher agent 116A-116E runs. In one example, a dispatcher agent 116A-116E is used to run counts on a data source/target and/or to determine whether a streaming process has completed successfully.

Streamer service 118A-118E is responsible for "get" and "put" operations. In an embodiment, streamer service 118E on data streaming system 108 communicates with client streamer agents such as streamer service 118A, 118B, 118C and/or 118D. Client streamer services may submit requests to stream data. For example, a client streamer service may submit a call to request/response broker 130 to stream data between systems.

In an embodiment, streamer services 118A-118E may be used to collect data from a local data source and to write data to a destination data source. Streamer services 118A-118E may write progress and results of the work that each respective service performs to metadata catalog 110. Further, client streamer services 118A-118D may work in cooperation with data streaming system 108 streamer service 118E to stream data.

Data streaming system 108 includes data adapter services 120, request/response broker 130, meta-service process 140, workload manager 150, worker processes 160, worker threads 170, command generation engine 180, profiler service 112E, monitor service 114E, dispatcher agent 116E, and streamer service 118E.

Data streaming system 108 orchestrates and performs high-speed data streaming services, for example, across distributed and non-compatible technology platforms. In one example, data streaming system 108 uses one or more clustered nodes (e.g., a Linux cluster) to perform operations. For example, the nodes provide the computing resources used to perform various activities including, but not limited to, receiving and processing requests, analyzing resources, storing workflows, determining which operations need to be executed, and streaming data.

In a federated data streaming environment, each data streaming system 108 among a plurality of related data streaming systems may have one or more of its own respective nodes that it uses to process data. In an example, each data streaming system 108 has at least one associated node to perform tasks. Data streaming systems 108 with multiple nodes may have a single master node and multiple worker nodes. In addition a master node also may serve as a worker node in a single or multi-node environment (e.g., a master node may dispatch work to be performed its own IP address). In one embodiment, data streaming systems 108 do not share any nodes. In other embodiments, data streaming systems may share nodes and/or borrow nodes (e.g., such as one or more worker nodes).

In high capacity, high performance, and/or high availability architectures, additional nodes may be added (for additional throughput, speed, fault tolerance, etc.) using a front end graphical user interface (GUI) tool or automatically from a pool of resources. Additional nodes may be added without any downtime using a GUI or an automated process. In general, the number of nodes associated with the data streaming system 108 is dynamic because nodes can be added or removed flexibly as a data streaming system remains online and operational.

In one example, data streaming system 108 is provided as a federated environment. For example, data streaming system 108 may exist as a plurality of different, interconnected data streaming systems that each operate independently, but share and transfer work fluidly. For example, a first data streaming system 108 may be allocated in a first geographic region, and a second data streaming system 108 may be allocated in a second geographic region among a plurality of geographic regions served by a federated environment.

In an embodiment, the first data streaming system 108 may receive a request to stream data between two data stores in the second geographic region. The first data streaming system 108 may be aware of the second data streaming system 108 in or associated with the second geographic region and may transfer the request to the second data streaming system 108 for processing (e.g., either prior to or after an authentication or validation process). Thus, the first data streaming system 108 may transfer or assign the work to the second data streaming system 108 in the federated configuration to ensure that the work is carried out efficiently (e.g., so as not to traverse a network), securely, and/or to satisfy specific service level requirements. Further, in an example, a data streaming system 108 may orchestrate streaming between data stores in a local cluster, in another cluster, across data centers, or between computer systems (including on the same computer system).

Data adapter services 120 is a set of software components that allow data streaming system 108 to connect to and interact with various types of data sources. For example, one or more data adapter services may be available to integrate a data source/target with data streaming system 108. In one example, a generic data adapter, such as a Java Database Connectivity (JDBC) adapter may be used to communicate with a data source/target. In another example, a native adapter developed specifically for high performance interaction and communication with a technological platform associated with a specific data source may be developed and utilized to provide fast/optimized data streaming. Data streaming system 108 may use a high-performance data streaming system architecture 100 that is independent of any technology platform or solution. Data adapter services 120 allow data streaming system 108 to interface with various non-compatible technical solutions offered by different vendors.

Request/response broker 130 receives and responds to requests from clients 101A, 101B. In one example, request/response broker 130 is a scalable component that, for example, allows hundreds or thousands of clients (e.g., 101A and 101B) to connect to data streaming system 108. When request/response broker 130 receives a request, it may analyze the request to determine the nature of the request (e.g., data streaming, loading, extracting, replication, etc.). Request response broker 130 then may select and call a corresponding utility to handle the request (e.g., data streaming utility, loading utility, extracting utility, replication utility, etc.).

Meta-service process 140 communicates with a metadata catalog 110. For example, meta-service process 140 may read data from and write data to metadata catalog 110.

Metadata catalog 110 may contain information about security, entitlements, data mapping, usage information, system resources, etc. that are associated with data streaming system 108. In an example, metadata catalog 110 also may contain physical and/or logical processing attributes and performance data associated with one or more of the various data sources/targets (e.g., 102A-C, 104A-C).

In an example, meta-service process 140 queries metadata catalog 110 to authenticate a user request based on a user's configured entitlements stored in metadata catalog 110. Meta-service process 140 also may read/write data streaming system 108 activity and performance data from/to metadata catalog 110.

Meta-service process 140 also may store data mapping information that allows data from a first data source/target (e.g., 102A, 102B, or 102C) to be associated or linked to a second data source/target (e.g., 104A, 104B, or 104C). In an example the mapping information allows data to be transferred between (to and/or from) the first data source/target and the second data source/target. In one example, a mapping or link between a source and destination may specify one or more specific data streaming systems 108 (or federations/namespaces) to be used for streaming data associated with the mapping/link.

Workload manager 150 is an internal scheduler process associated with a data streaming system 108. In one example, workload manager 150 runs on a master server in a cluster of servers that are part of a data streaming system 108. Workload manager 150 may analyze mapping metadata describing associations between a first data source/target and a second data source/target.

In one example, workload manager 150 may determine that a job it receives to transfer data between two data stores should be run on at least one other data streaming system 108 among a plurality of data streaming systems (e.g., based on a service level agreement, geographic location, expected resource utilization, available resources, user configuration/federation/namespace in a mapping/link etc.). Workload manager 150 also initiates or calls upon worker processes 160 to perform work associated with the request received by data streaming system 108.

In one embodiment, each data streaming system 108 in a plurality of data streaming systems has its own respective workload manager 150. For example, each data streaming system 108 may have its own workload manager 150 that runs on the respective master node of the data streaming system 108. In one example, each workload manager 150 has its own governor or boundary in terms of a total number of jobs that it can perform at one time (regardless of how many jobs could physically run on a source, target, and/or data streaming at any given time). For example, an administrator may configure a data streaming system 108 workload manager 150 configuration parameter defining a maximum number of jobs that the particular workload manager can execute simultaneously.

In an example, workload manager 150 acts as a governor for all processing associated with data streaming system 108. For example, even if external resources are capable of performing thirty jobs in parallel against a source, workload manager 150 may restrict the maximum number of jobs that may execute based on its own configured maximum (e.g., fewer than thirty), if needed. Workload manager 150 may perform orchestration not only by acting as a governor of processing that occurs on data streaming system 108, but also because it understands (through metadata catalog 110) what each system is capable of doing and how much work each system is performing at any given point in time. Thus, workload manager 150 may dispatch work and run data processing jobs intelligently based on such information.

Workload manager may be responsible for determining when requested operations should be performed. In one example, workload manager 150 makes calls to metadata catalog 110 to identify pending requests, processing states, processing capabilities, existing workloads, etc. of computer systems associated with pending requests when dispatching jobs. For example, workload manager 150 may read metadata catalog 110 to determine current statistics about various aspects of a source system, a target destination system, a data streaming system 108, one or more networks, network equipment and/or one or more other computing resources. Thus, workload manager 150 may become aware of contention (or availability) that exists on a machine, on a piece of network equipment, on one or more networks, at a source server, and/or at a destination server.

In one example, workload manager 150 identifies systems that will be used to process a data streaming transaction based on a mapping that is stored in metadata catalog 110. Workload manager 150 also may be configured with parameters to identify how many concurrent jobs can be run at any given time on data streaming system 108. Further, each individual computer system, such as a source or target system, may have its own associated parameters defined in metadata catalog 110 that indicate how many concurrent jobs a respective resource can handle or is configured to handle at a given time. Workload manager 150 may consider such information when determining whether to dispatch a pending data streaming request for processing.

In one example, workload manager 150 and/or profiler service 112A-112E may identify a critical situation on one or more systems associated with a pending or active streaming process. For example, workload manager 150 may proactively identify that a system is running out of free space or that a system is running above a critical CPU or memory threshold. Workload manager 150 may not dispatch a pending data streaming request for completion when such a critical situation exists. Instead, workload manager 150 may send an alert notification to an administrator or user about the condition and may provide notification that the job will not be processed. In some embodiments, workload manager 150 interacts with systems across different data centers, geographical locations, and business entities.

In an embodiment, worker processes 160 receive jobs that are dispatched from workload manager 150 to perform work associated with an incoming data streaming request. In an example, worker processes 160 may run on one or more nodes in a cluster of nodes that are associated with data streaming system 108.

After receiving a job that is dispatched by workload manager 150, a worker process 160 may update the state of the dispatched job to active. A worker process 160 then may analyze and inspect the data to be transferred from the first data source/target to a second data source/target. For example, a worker process 160 may analyze data that is stored in metadata catalog 110 describing how a payload of data is physically and/or logically structured and partitioned.

A worker process 160 may analyze such metadata to determine how the data may be partitioned/divided (and subsequently ingested) as a plurality of smaller sized units, which may be processed and streamed concurrently by various computing resources having different capabilities. Further, a worker process 160 may invoke a plurality of worker threads 170 to carry out data processing. The number of invoked worker threads 170 may be based on one or more of available system resources at a data source, a target destination, or a data streaming system 108.

In one example, worker process 160 is "partition aware" meaning it understands how data is physically stored and it is able to determine how data can be logically and/or physically partitioned to facilitate parallel processing. In an example, a physical partition may be how data is stored in a file, on a file system, or in a partitioned database (e.g., one file, ten files, hundreds of files, thousands of files, in a particular directory structure based on one or more criteria, etc.). In another example, a logical partition may be a way to split the data up based on a value, such as by date, products, categories, etc. A physical or logical partition may be defined by an administrator as part of identifying a partition strategy for particular data source. Such a partition strategy may be stored in metadata catalog 110 to assist worker process 160 in determining how to process the data.

In an example, worker process 160 determines an allocation model or number of threads to use based on physical and/or logical partitions identified for the data. In one example, worker process 160 may identify partitions using information describing attributes and storage characteristics of the data, which may be available in metadata catalog 110. In another example, worker process 160 also may dynamically detect partitions or determine how to partition the data by analyzing the data itself, by analyzing metadata describing the data, and/or by analyzing logical and physical storage characteristics associated with the data.

In one example, a worker process 160 responsible for transferring data from 1000 files to a target destination may allocate or assign four asynchronous threads to carry out the data transfer. For example, worker process 160 may allocate 250 files to each thread to evenly allocate the work across the four threads. The worker process 160 may generate an internal manifest (file or metadata) to instruct which specific files or group of files a specific thread should process (e.g., Thread1 <1-250>, Thread2 <251-500>, Thread3 <501-750>, Thread4 <751-1000>).

Worker process 160 also may allocate segments of data to be processed in parallel based on size, for example, when segments of data vary in size and are not uniform. In an example, worker process 160 sorts files to be processed by size and then distributes the files to each thread on a round robin basis as a method of evenly distributing the load across the threads.

In an embodiment, workload manager 150 dispatches a job to one of a plurality of worker processes 160 based on a request to stream data from a data source to a target destination. For example, workload manager 150 may dispatch a job to a worker process 160 indirectly by updating metadata catalog 110 rather than directly calling the worker process 160. In an example, workload manager 150 may determine that a worker process 160 is available by reading metadata catalog 110 and may assign a job to that worker process 160 by updating a job assignment field associated with a corresponding unique identifier (e.g., a run_id) in metadata catalog 110.

A worker process 160 may run on one or more worker nodes depending on configuration and/or available capacity. In one example, a worker process 160 modifies the state of a job in metadata catalog 110 from pending to active when it receives the job. The worker process 160 also may analyze and inspect the data to be transferred by analyzing information stored in metadata catalog 110 that describes how the data is structured and organized. For example, a worker process 160 may determine a concurrency factor based on analyzing how the data can be logically and/or physically partitioned so that such partitions may be processed in parallel when transmitting the data to a target destination.

In one example, a worker process 160 may analyze physical data storage attributes such as a directory structure, a number of files, and/or file sizes used to store data when determining a partition strategy. A worker process 160 also may analyze logical data storage attributes, such as size or field types when determining a partition strategy. Further, worker process 160 may analyze an a sampling or an entire set of data to determine how the data is structured, stored, and/or distributed when determining a partition strategy. In one example, worker process 160 determines how a set of data may be decomposed into a plurality of smaller pieces that can be processed efficiently in parallel across a number of different similar or non-similar computing resources having various levels of availability and performance.

In an embodiment, worker process 160 determines a degree of parallelism/concurrency factor associated with the data. For example, a worker process 160 may determine that a dataset can be divided into four, sixteen, hundreds, or thousands of pieces (e.g., files, queries, etc.) for parallel processing. A worker process 160 then may invoke one or more threads (i.e., worker threads 170) to carry out parallel streaming of the data from a data source to a target destination. In one example, the worker process 160 invokes a number of threads corresponding to a determined degree of parallelism/concurrency factor. Thus, if the concurrency factor is "four" the worker process 160 may invoke four threads to stream the data in parallel.

In an example, worker process 160 may analyze a payload to determine how efficiently associated data can be processed in parallel. In one example, worker process 160 dispatches a single worker thread 170 when the payload is a single file/chunk of data. When there are many files/chunks of data, worker process 160 may invoke a plurality of threads based on a determined degree of parallelism/concurrency factor, client-based configuration settings, server-based configuration settings and/or available computing resources on one or more computing systems. One or more allocated worker threads 170 then may stream the payload from the data source to a target destination. The streaming may include filtering and/or transforming the data as it is transferred from the data source to the target destination. Allocated worker threads 170 may perform this work based on execution plan metadata stored in metadata catalog 110 which is dynamically generated into executable code at runtime.

In one example, each of a plurality of worker threads 170 invoked by a worker process 160 to carry out parallel data streaming reads metadata catalog 110 to access filtering and/or transformation code generated on the fly at runtime from execution plan metadata stored in metadata catalog 110. Filtering and/or transformation code is generated based on an execution plan created by workload manager 150 (for example, from a user-created data mapping, work flow, etc.). In an example, each worker thread 170 assembles its own version (working copy or instantiation) of a sequence of operational components that it uses to perform various operations on the data (e.g., filtering, aggregating, transforming, scrubbing, etc.) as the data is being streamed.

In one example, a sequence of operational components is generated at runtime. For example, a worker thread 170 may assemble a set of operational components into a chain where the standard output of one component becomes the standard input of the next component in the sequence. Thus, each thread may process data in parallel as part of a pipeline architecture (e.g., when a first piece of data has been passed from a first operation as standard output to a second assembled operation as standard input, a second piece of data is processed simultaneously using the first operation while the second operation is performed on the first piece of data, and so on). Multiple layers of parallelism may be used to achieve substantially increased performance, for example, when each worker thread 170 processes its own set of partitioned source data segments that are also processed in parallel with other partitioned source data segments along a pipeline of chained operational components.

In one embodiment, worker threads 170 periodically write their progress to metadata catalog 110. A worker process 160 that has allocated the worker threads 170 also may periodically poll metadata catalog 110 to check on the status of the worker threads 170. Worker process 160 also may analyze metadata to determine whether each of its worker threads 170 has completed their respective portion of the data streaming successfully. If so, the worker process 160 changes the status of the entire job in metadata catalog 110 from "active" to "final." On the other hand, and depending on situation, the worker may update the status to "failed" if any associated worker threads 170 did not complete successfully.

In an example, a worker process 160 may stop long-running jobs either automatically or based on a user request and update the job status to "abort" or "canceled." The worker process 160 also may update the status to "empty" when no data is produced from the source, for example, because no data exists at the source or because no resulting data was produced when applying a filter.

In an embodiment, source data is compressed at a source system to reduce a size of data to be transferred over a network, for example, when source data is directly streamed to the destination server without any manipulation. Data then may be decompressed at the destination accordingly, if needed. In another example, compressed data at the source is decompressed at the source when workload manager 150 determines that filtering and/or any type transformation should occur before the data reaches the target destination.

Command generation engine 180 generates functions that materialize at runtime based on metadata. Functions created by command generation engine 180 are assembled and executed by each worker thread 170, thus allowing each thread to effectively function as a compartmentalized transformation engine with access to a library of its own set of lightweight functions for optimized performance.

In an embodiment, command generation engine 180 reads metadata catalog 110 to determine functions to generate for worker threads 170 that have been or will be invoked to carry out an execution plan generated by workload manager 150. In an example, workload manager 150 may determine that a set of operations to be performed on a set of data to be streamed from a data source to a target destination. The operations may be defined, for example, as part of or in addition to a data mapping between one or more fields of a data storage location of a data source and one or more fields of a data storage location of a target destination. Workload manager 150 may produce an execution plan for carrying out the streaming, the execution plan comprising a set of functions (e.g., transformation, filtering, custom, etc.) to be executed in sequence by each of one or more worker threads 170.

In an example, an execution plan generated by workload manager 150 may be represented as a set of configuration parameters or in an XML format that may be processed and executed by one or more different versions of a data streaming system 108 engine. For example, data streaming system 108 may generate, execute, and/or run execution plan instructions or commands that are represented as a set of custom parameters or in a custom XML format.

Figure 2:
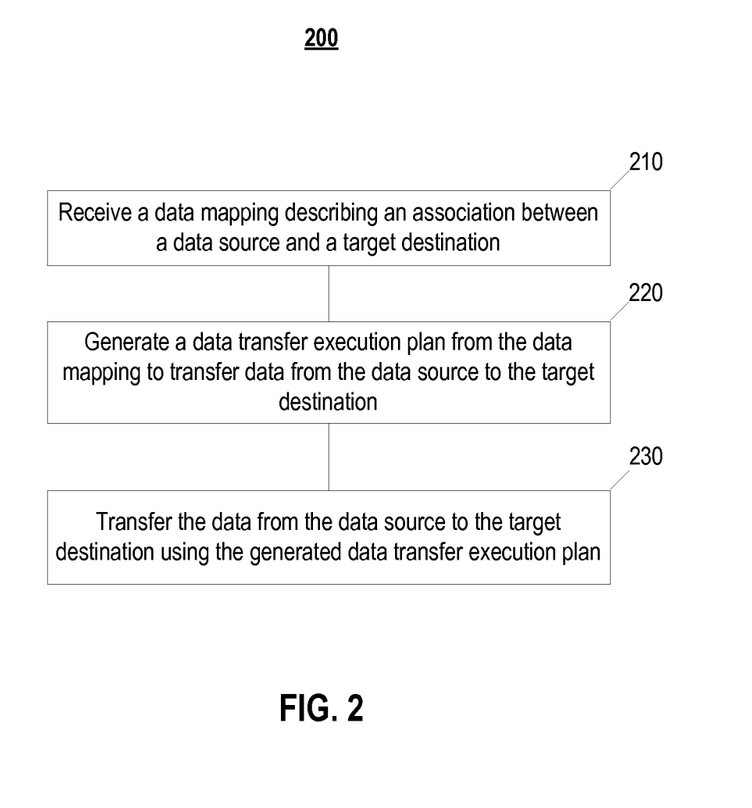
FIG. 2 is a flow diagram illustrating high performance data streaming, according to an embodiment of the present invention.

FIG. 2 is a flow diagram illustrating high performance data streaming, according to an embodiment. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 200 is performed using data streaming system 108 of FIG. 1.

At stage 210, a data mapping describing an association between a data source and a target destination is received. In an embodiment, one or more data elements in a storage location of a first data source are associated or linked to one or more data elements in a storage location of a target destination. (e.g., data file elements, database fields, XML data, data fields in custom data formats, etc.). In general, any data mapping describing an association or relationship between two or more data elements, fields, containers, files, or other data structures may be received.

In an example, data may be mapping directly from a data source to a target destination. Data transformations also may be defined to modify data from a data source as data is being streamed to a target destination. For example, one or more data transformations may be defined as part of a data mapping. The data transformations may be configured to modify source data, for example, by combining a plurality of source data fields into a target destination field, splitting source data fields into multiple target destination fields, filtering source data, scrubbing source data, etc. Such mapping and transformations may be provided in a user-defined workflow configured to transform data from a data source when the data is streamed to a target destination.

At stage 220, a data transfer execution plan is generated from the data mapping to transfer the data from the data source to the target destination. In an embodiment, workflow engine 150 analyzes a data mapping describing an association between a data source and a target storage destination. The data mapping may include data transformations and other operations to be performed when data is streamed from the data source to the target destination.

In an embodiment, workflow engine 150 generates and stores an execution plan for data mappings and transformations as metadata in metadata catalog 110. In an example, the execution plan metadata generated by workflow engine 150 may be processed, interpreted, and/or executed by one or more different versions of data streaming system 108. The metadata also may be used to generate code executable code, which may be executed by any process (e.g., worker threads 170).

At stage 230, data is transferred from the data source to the target destination using the generated data transfer execution plan. In one embodiment, data streaming system 108 uses a data transfer execution plan stored in metadata catalog 110 to generate executable code at runtime. Data streaming system then may run the executable code generated from the data transfer execution plan metadata using worker threads 170. Thus, the worker threads 170 may execute the code generated at runtime to stream data from a data source to a target destination.

Figure 3:
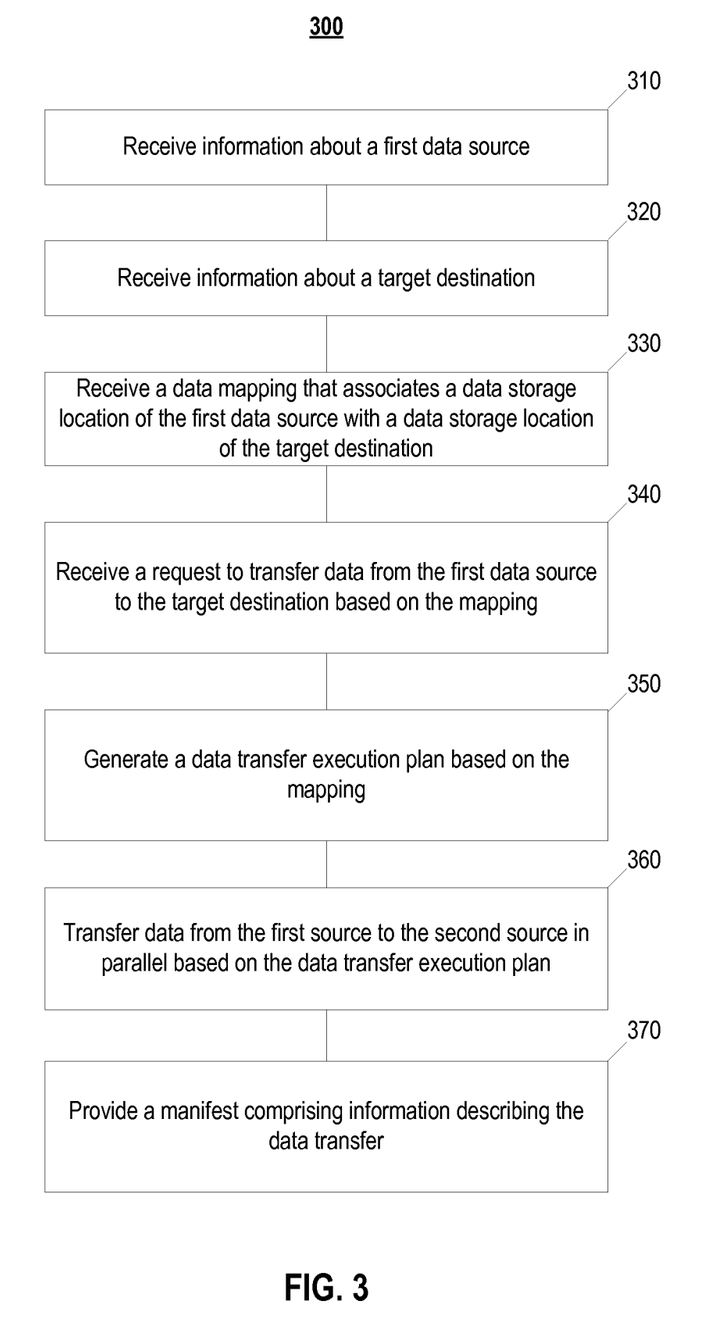
FIG. 3 is a flow diagram illustrating further aspects of high performance data streaming, according to an embodiment of the present invention.

FIG. 3 is a flow diagram illustrating further aspects of high performance data streaming, according to an embodiment. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 300 is performed using data streaming system 108 of FIG. 1.

At stage 310, information about a first data source is received. At stage 320, information about a target destination is received. In an embodiment, a data source is registered by a user on a client 101A, 101B using a graphical user interface (GUI) as part of a registration process. One or more data sources also may be automatically discovered and registered by data streaming system 108.

As part of a discovery or registration process, information may be learned or acquired about a data source. For example, data source information may include one or more of fixed or available computing resources of a computer system hosting the data source, information about the type of data source (e.g., relational database, in memory database, object relational database, file system, appliance, etc.), vendor information, version information, computer system and/or data source configuration settings, computer system availability and/or data source features or compatibility, etc.

In an example, a first data source may include one or more of data sources/targets 102A-102C, and a second data source may include one or more of the resources/targets 104A-104C (or vice versa). Further, information received, gathered, discovered or acquired about a first data source and/or a second data source may be stored as metadata in metadata catalog 110 for later reference by data streaming system 108.

At stage 330, a data mapping that associates a data storage location of the first data source with a data storage location of the target destination is received. In an example, named data elements from a first data source are associated or linked to named data elements that exist in a second data source/target destination (e.g., database fields). In general, a mapping, association or relationship between any two data storage elements, fields, containers, files, etc. may be received.

In an example, a mapping between a data source and a target destination may be designed by a user as a workflow that transforms data from a source system format into a form that is compatible with a target destination system. (e.g., using a workflow designer). Thus, a mapping may comprise operations that are used to modify data that is to be transferred or copied from a source system to target destination system (e.g., as part of a data streaming job).

In another embodiment, source data may be mapped based on a detected pattern. For example, if an administrator or pre-process has not created a metadata mapping, such a mapping may be generated in real-time. Real-time data mapping may be based on one or more subject matter areas (e.g., trades) that are identified as part of a request. Subject matter areas may be used to search metadata dynamically in real-time, for example, using source data identified as matching one or more particular subject areas.

In one example, a worker process 160 may run a pattern search based on a subject area and perform an inspection on data associated with a particular subject area to determine how many worker threads 170 it will invoke to process the dynamically identified data. For example, a worker process 160 may learn that trading data for each of a plurality of financial instruments is stored in a respective file for each of the instruments. Worker process 160 may discover and/or be directed to process a full or partial set of the trading data. In an example, worker process 160 allocates a worker thread 170 to stream each different respective file that it has been directed to process.

At stage 340, a request is received to transfer data from the first data source to the target destination based on the mapping. In an embodiment, a request to move data between a source system and a target system is received. For example, the request to stream, load, extract and/or replicate data between one or more computer systems may be received in a request. For example, a request to move data between two different data centers may be received by request/response broker 130. In an example, a request may name logical and/or physical data resources that will be streamed (e.g., transferred, copied, etc.) from a data source to a target destination.

In an embodiment, request/response broker 130 analyzes an incoming request to determine information about the request. For example, request/response broker 130 may determine the type of request that is received so that it may call an appropriate corresponding processing utility, component or service. In an example, request/response broker 130 may invoke a streaming utility that validates and authenticates the request. For example, the streaming utility may authenticate a particular user initiating the request and confirm that the request is valid.

In an example, a streaming request references a predefined mapping between two data stores. A streaming utility performs a lookup in metadata catalog 110 to determine if such a mapping exists. If so, streaming utility that uses metadata catalog 110 to further validate the request. For example, a streaming utility may validate a time dimensionality of a requested data set before actually attempting to stream the data set.

In an embodiment, once a user request has been authenticated and a data mapping has been validated in view of the requested data, the request is queued for processing and its status is updated to "pending." In one example, a unique run_id identifier is generated for a request that is submitted for processing. For example, a meta-service process 140 may generate a unique 24-digit identifier for the request. Meta-service process 140 then may enter the request in metadata catalog 110 to allow tracking of the request and its associated data throughout the lifecycle of the request.

Once a request has been submitted for processing in metadata catalog 110, information associated with the request may be logged in metadata catalog 110 by meta-service processes 140. For example, a user ID, user account, application ID, IP address where the request originated, request type, link information (source-to-target relationship/mapping) and other information and details about the request may be stored in metadata catalog 110. Further, the status of the request may be updated to a "pending" state, which will identify the request as available for processing in a list of queued requests that are analyzed by workload manager 150.

In an example, workload manager 150 looks for requests in a "pending" state that are ready for processing. Further, when workload manager 150 has available worker processes 160, it may assign a worker process 160 to complete a "pending" request.

At stage 350, a data transfer execution plan is generated based on a data mapping. In an example, workflow engine 150 analyzes mapping information describing an association between a data source and a target storage destination. The mapping may include, be based, or be used to generate a workflow or sequence of interconnected steps that can be used to process source data so that it is compatible and fits within the paradigm of the target storage destination (logically and/or physically). For example, source data may need to be filtered, parsed, transformed, converted, etc. as part of the streaming process.

In an example, workload manager 150 generates and stores an execution plan that allows one or more worker threads 170 to build or assemble a series of commands used to execute the process (mapping/workflow) at runtime. In one example, workload manager 150 generates an execution plan as a set of XML-formatted data, which is stored in metadata catalog 110.

At stage 360, the data is transferred from the first data source to the target destination in parallel based on the data transfer execution plan. In an embodiment, a data transfer execution plan generated by workload manager is stored in metadata catalog 110. The data transfer execution plan may include information that allows worker threads 170 to carry out data mapping/workflow operations as data is streamed from a source to a target destination.

For example, data pulled from a data source may need to be filtered as part of a streaming process. In addition, the data may need to be transformed in one or more ways to allow it to be compatible in form (e.g., physically) or in substance (e.g., logically) based on a target destination configuration. Thus, data may need to be modified in various ways, which may include but are not limited to concatenation, truncation, replacement, updates, custom functions, etc.

Depending on how a particular mapping or workflow is designed, these operations may need to be performed in a particular sequence. Further, standard or custom operations (e.g., user-defined functions, procedures, etc.) may be utilized. In an embodiment, custom functions and procedures may be created by a user and integrated into data mapping/workflow as one or more ordered steps. In an example, custom functions/procedures may be defined by a user in a proprietary scripting language (e.g., on-demand data streaming script). In another example, custom functions/procedures also may be defined by a user using structured query language (SQL) or another computer language.

In an embodiment, after workload manager 150 generates an execution plan and finds an available worker process 160 to handle and incoming request, workload manager 150 assigns the request to the available worker process 160.

In an example, a worker process 160 determines how it will process work associated with the request. For example, worker process 160 may analyze the payload of the source data that needs to be processed. Worker process 160 may analyze source data to determine how the data may be partitioned or pruned physically, logically, horizontally, vertically etc. Worker process 160 may analyze source data based on information in metadata catalog 110, or by accessing the data directly (e.g., by sampling, by examining how the data is stored, etc.). Worker process 160 also may analyze utilization and capacity of the source machine as well as utilization and capacity of the target machine. Worker process 160 may use this information to determine a degree of parallelism that may be used to process source data in parallel.

In an embodiment, worker process 160 invokes one or more asynchronous worker threads 170, which it does not directly communication with. In one example, worker process 160 may interact with associated threads indirectly by reading and/or writing metadata stored in metadata catalog 110. Worker threads 170, for example, may run on the same node or be spread across different worker nodes associated with one or more data streaming systems 108 in a federated environment. Worker threads 170 may carry out the operations needed to be performed to complete a request assigned by the workload manager 150. In an example, worker threads 170 execute operations defined in an execution plan created by workload manager 150.

In an embodiment, metadata catalog 110 stores a listing of each procedure/function (including processing sequence) associated with an execution plan for a job that has been generated by workload manager 150. In an example, command generation engine 180 generates functions that materialize at runtime based on metadata stored in metadata catalog by workload manager. Functions created by command generation engine 180 are assembled and executed by worker threads 170, thus allowing each thread to effectively function as a self-contained transformation engine with access to a library of its own respective set of lightweight functions.

In an embodiment, command generation engine 180 analyzes a data transfer execution plan generated by workload manager 150 stored in metadata catalog 110. Command generation engine 180 then generates pieces of code (functions/procedures) that are executable by worker threads 170.

In an embodiment, command generation engine 180 may generate executable code for standard, system provided functions/procedures. Command generation engine 180 also may generate executable code for user-defined functions and procedures written in the computer language such as a proprietary scripting language or structured query language (SQL). In an example, command generation engine 180 generates code at runtime and may be called by worker processes 160. In one example, command generation engine 180 may generate code at any time.

In an embodiment, each worker thread 170 assigned to a job uses code generated by command generation engine 180 to configure a respective, self-contained instance of a mapping/transformation/workflow engine to process and stream source data to a target destination. In one example, worker threads 170 assemble the executable pieces of code generated by command generation engine 180 according to an execution plan previously created by workload manager 150.

In one embodiment, worker threads 170 assemble executable pieces of code in a sequence and in a manner defined by an execution plan. Each worker thread may assemble different executable pieces of code by chaining the different pieces of code together. For example, the first executable piece of code (component) may receive the unit of data as standard input. Worker threads 170 may then chain the first component to a second component so that standard output of the first component feeds standard input of the second component. Continuing with this non-limiting example, the standard output of the second component then may feed the standard input of third component, and so on. Thus, the input of any function is the output of the previous function throughout an entire sequence.

In the previous example, each worker thread effectively becomes a transformation engine with access to a library of functions that materialize at runtime. Thus, source data may be processed seamlessly as it is streamed in a stateless environment without any blocking.

At stage 370, a manifest comprising information describing the data transfer is provided. In one embodiment, a delivery manifest is written on successful completion of a data streaming job. In one example, identical or different delivery manifests are written on a source system and on a target destination system when the data-streaming job has finished successfully. The delivery manifest may include one or more of a description of the data that was delivered, a start time, an end time, files that were delivered, a size of each file delivered, characteristics of each file delivered, etc.

In one example, a delivery manifest also includes a status and information about formatting of data that was delivered. For example, such information may include a delimiter, error messages, data formatting (e.g., field types, time formats, date formats, numerical formats, NULL values, use of special characters), etc.

In one example, a job scheduler at a target destination will look for a delivery manifest file before beginning to process any incoming data. In some embodiments, this ensures that the job scheduler will not begin subsequent processing prematurely because the delivery manifest may be the last piece of information that is written when a streaming job has been completed.

In an embodiment, data that has been delivered to the target destination is described in the delivery manifest, which allows the data to be handed off to an organization downstream without requiring any changes to data streaming system 108. In one example, data that has been delivered is described and can be processed by a receiving organization based on the description provided by the manifest. Thus, upstream changes to source data by one organization should not impact operations on data streaming system 108 because the organization receiving the data at the target destination may rely on the destination manifest generated for a data streaming job.

Figure 4:
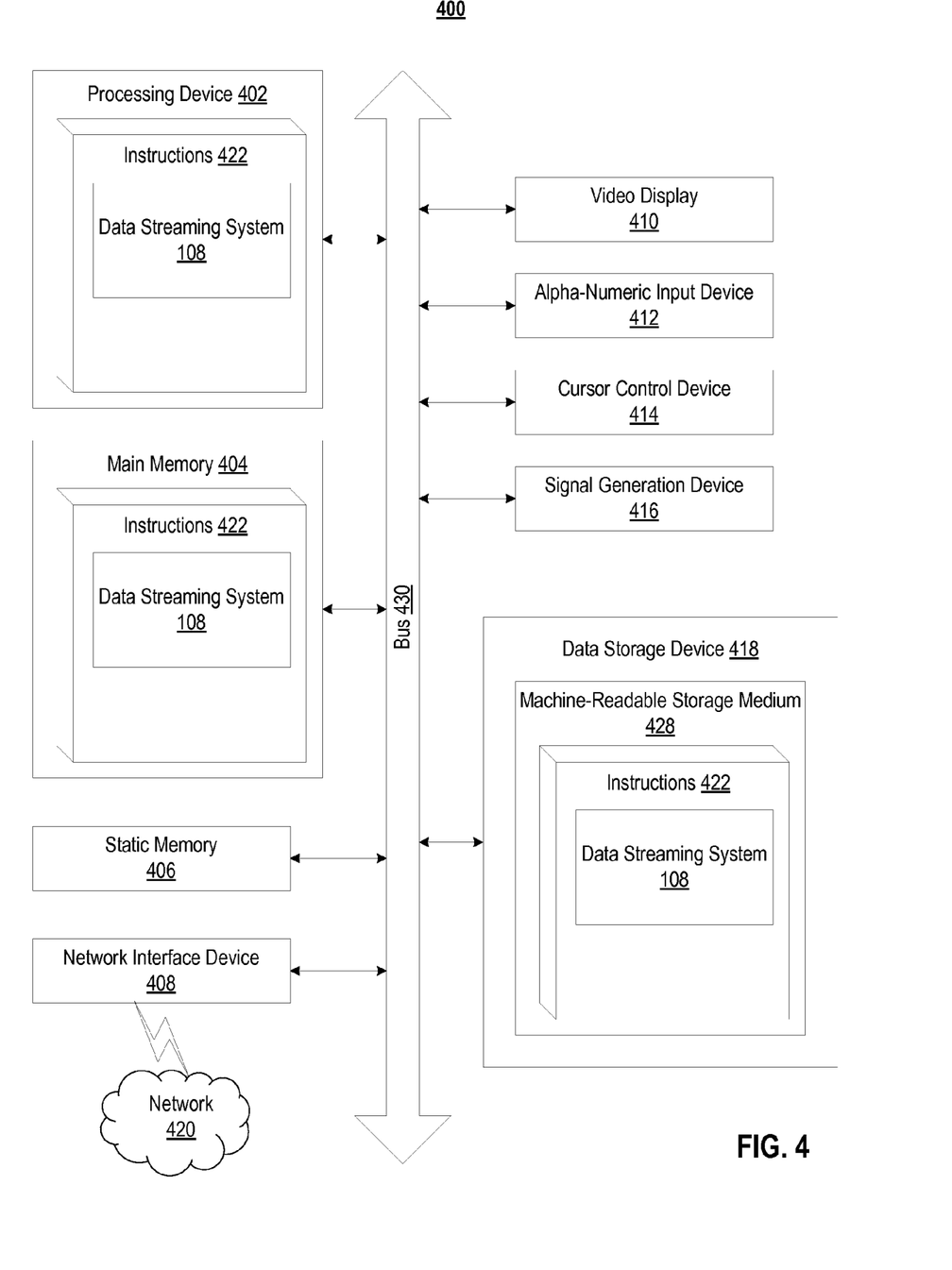
FIG. 4 is a block diagram of an exemplary computer system that may perform one or more of the operations described herein.

FIG. 4 illustrates a diagram of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions 422 (e.g., software) embodying any one or more of the methodologies or functions described herein. The instructions 422 may also reside, completely or at least partially, within the main memory 404 and/or within the processor 402 during execution thereof by the computer system 400, the main memory 404 and the processor 402 also constituting computer-readable storage media. The instructions 422 may further be transmitted or received over a network 420 via the network interface device 408.

In one embodiment, the instructions 422 include instructions for a high performance data streaming system architecture 100 (e.g., data streaming system 108 of FIG. 1) and/or a software library containing methods that call a data streaming system 108. While the computer-readable storage medium 428 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

What is claimed is:

1. A computer-implemented method, comprising:
    receiving, by a processor, a data mapping describing an association between one or more fields of a data storage location of a data source and one or more fields of a data storage location of a target destination;
    analyzing metadata of the data from the data source to identify attribute information associated with parallel processing;
    determining a degree of parallelism to use when transferring the data between the data source and the target destination based on the identified attribute information;
    generating, by the processor, a data transfer execution plan from the data mapping to transfer data from the data source to the target destination, the data transfer execution plan comprising the determined degree of parallelism to use when transferring the data; and
    transferring, by the processor, the data from the storage location of the data source to the data storage location of the target destination using the generated data transfer execution plan.

2. The method of claim 1, further comprising:
    receiving information describing the data source, the data source comprising the data to be transferred to the target destination; and
    receiving information describing the target destination, the target destination to receive the data from the data source.

3. The method of claim 1, further comprising:
    receiving a request to transfer the data from the data storage location of the data source to the data storage location of the target destination.

4. The method of claim 1, further comprising:
    analyzing the data from the data source to determine a degree of parallelism to use when transferring the data between the data source and the target destination.

5. The method of claim 1, further comprising:
    determining a degree of parallelism to use when transferring the data between the data source and the target destination.

6. The method of claim 1, further comprising:
    providing a manifest comprising information describing a result produced when transferring the data from the data source to the target destination.

7. The method of claim 1, wherein the data is transferred from the data source to the target destination in parallel according to the determined degree of parallelism.

8. A system, comprising:
    a memory; and
    a processor coupled with the memory to:
    receive a data mapping describing an association between one or more fields of a data storage location of a data source and one or more fields of a data storage location of a target destination;
    analyze metadata of the data from the data source to identify attribute information associated with parallel processing;
    determine a degree of parallelism to use when transferring the data between the data source and the target destination based on the identified attribute information;
    generate a data transfer execution plan from the data mapping to transfer data from the data source to the target destination, the data transfer execution plan comprising the determined degree of parallelism to use when transferring the data; and
    transfer the data from the storage location of the data source to the data storage location of the target destination using the generated data transfer execution plan.

9. The system of claim 8, wherein the processor further is to:
    receive information describing the data source, the data source comprising the data to be transferred to the target destination; and
    receive information describing the target destination, the target destination to receive the data from the data source.

10. The system of claim 8, wherein the processor further is to:
    receive a request to transfer the data from the data storage location of the data source to the data storage location of the target destination.

11. The system of claim 8, wherein the processor further is to:
    analyze the data from the data source to determine a degree of parallelism to use when transferring the data between the data source and the target destination.

12. The system of claim 8, wherein the processor further is to:
    determine a degree of parallelism to use when transferring the data between the data source and the target destination.

13. The system of claim 8, wherein the processor further is to:
    provide a manifest comprising information describing a result produced when transferring the data from the data source to the target destination.

14. A non-transitory computer readable storage medium having instructions recorded thereon that, when executed by a processor, cause the processor to perform operations comprising:
    receiving, by the processor, a data mapping describing an association between one or more fields of a data storage location of a data source and one or more fields of a data storage location of a target destination;

analyzing metadata of the data from the data source to identify attribute information associated with parallel processing;

determining a degree of parallelism to use when transferring the data between the data source and the target destination based on the identified attribute information;

generating, by the processor, a data transfer execution plan from the data mapping to transfer data from the data source to the target destination, the data transfer execution plan comprising the determined degree of parallelism to use when transferring the data; and transferring, by the processor, the data from the storage location of the data source to the data storage location of the target destination using the generated data transfer execution plan.

15. The non-transitory computer readable storage medium of claim 14, further comprising:

receiving information describing the data source, the data source comprising the data to be transferred to the target destination; and receiving information describing the target destination, the target destination to receive the data from the data source.

16. The non-transitory computer readable storage medium of claim 14, further comprising:

receiving a request to transfer the data from the data storage location of the data source to the data storage location of the target destination.

17. The non-transitory computer readable storage medium of claim 14, further comprising:

analyzing the data from the data source to determine a degree of parallelism to use when transferring the data between the data source and the target destination.

18. The non-transitory computer readable storage medium of claim 14, further comprising:

determining a degree of parallelism to use when transferring the data between the data source and the target destination.

19. The non-transitory computer readable storage medium of claim 14, further comprising:

providing a manifest comprising information describing a result produced when transferring the data from the data source to the target destination.

20. The non-transitory computer readable storage medium of claim 14, wherein the data is transferred from the data source to the target destination in parallel according to the determined degree of parallelism.

* * * * *